Figure 6:
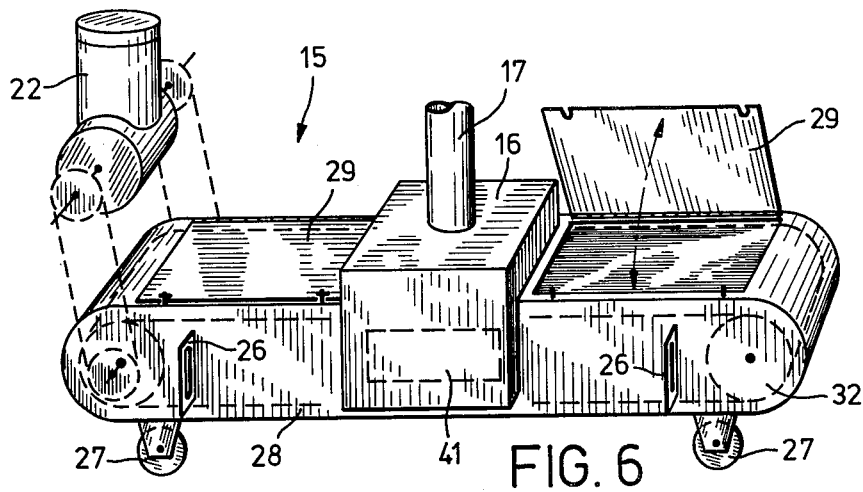

United States Patent [19]

Murray

[11] 4,182,493
[45] Jan. 8, 1980

[54] SELF-PROPELLED IRRIGATION APPARATUS

[76] Inventor: Larry C. Murray, Rte. 4, Box 405, Idaho Falls, Id. 83401

[21] Appl. No.: 879,890

[22] Filed: Feb. 21, 1978

[51] Int. Cl.² .............................................. B05B 3/00
[52] U.S. Cl. .................................... 239/183; 239/184
[58] Field of Search ............... 239/181, 183, 212, 184; 137/344

[56] References Cited

U.S. PATENT DOCUMENTS

| | | | |
|---|---|---|---|
| 2,628,863 | 2/1953 | Maggart | 239/212 X |
| 3,349,794 | 10/1967 | Behlen | 239/183 X |
| 3,444,941 | 5/1969 | Purtell | 239/183 X |
| 3,608,825 | 9/1971 | Reinke | 239/212 |
| 3,970,102 | 7/1976 | Harvey | 239/183 |

Primary Examiner—John J. Love
Attorney, Agent, or Firm—K. S. Cornaby

[57] ABSTRACT

The self-propelled irrigation apparatus of the invention has a self-propelled trolley means mounted on water-carrying pipe means disposed in an area to be irrigated. Valve means actuated by depressable levers are disposed in spaced-apart relationship along the upper side of the pipe means. Valve-actuating means mounted on wheels within the trolley means more along with the trolley to lower over each valve means to depress the actuating lever and open the valve means. Water flows from the pipe means through the valve actuating means to a receptacle means. A distribution system carries the water from the receptacle means through sprinklers or the like to the area to be irrigated.

9 Claims, 25 Drawing Figures

U.S. Patent     Jan. 8, 1980     Sheet 1 of 3     4,182,493
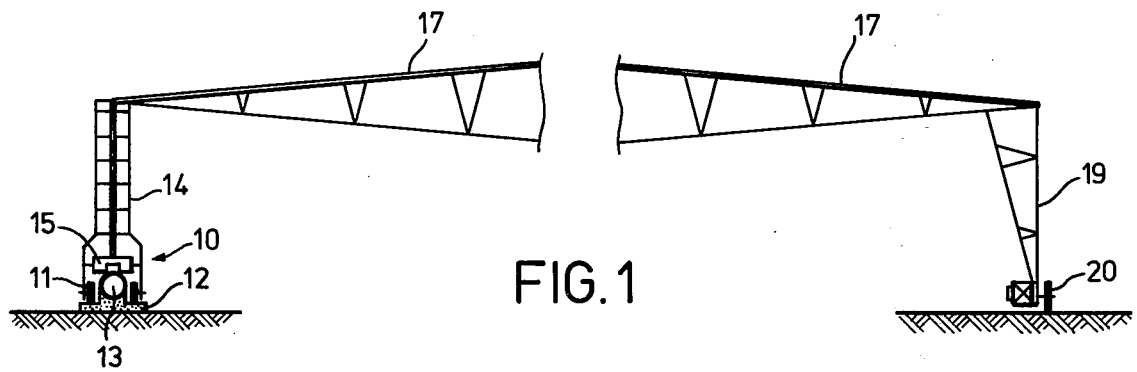
FIG. 1
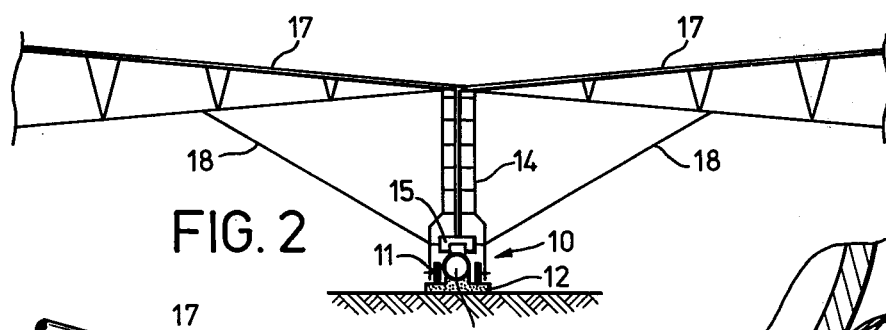
FIG. 2
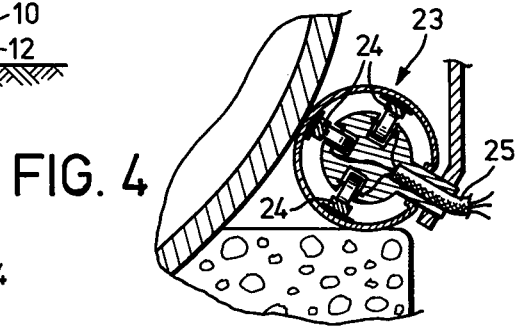
FIG. 4
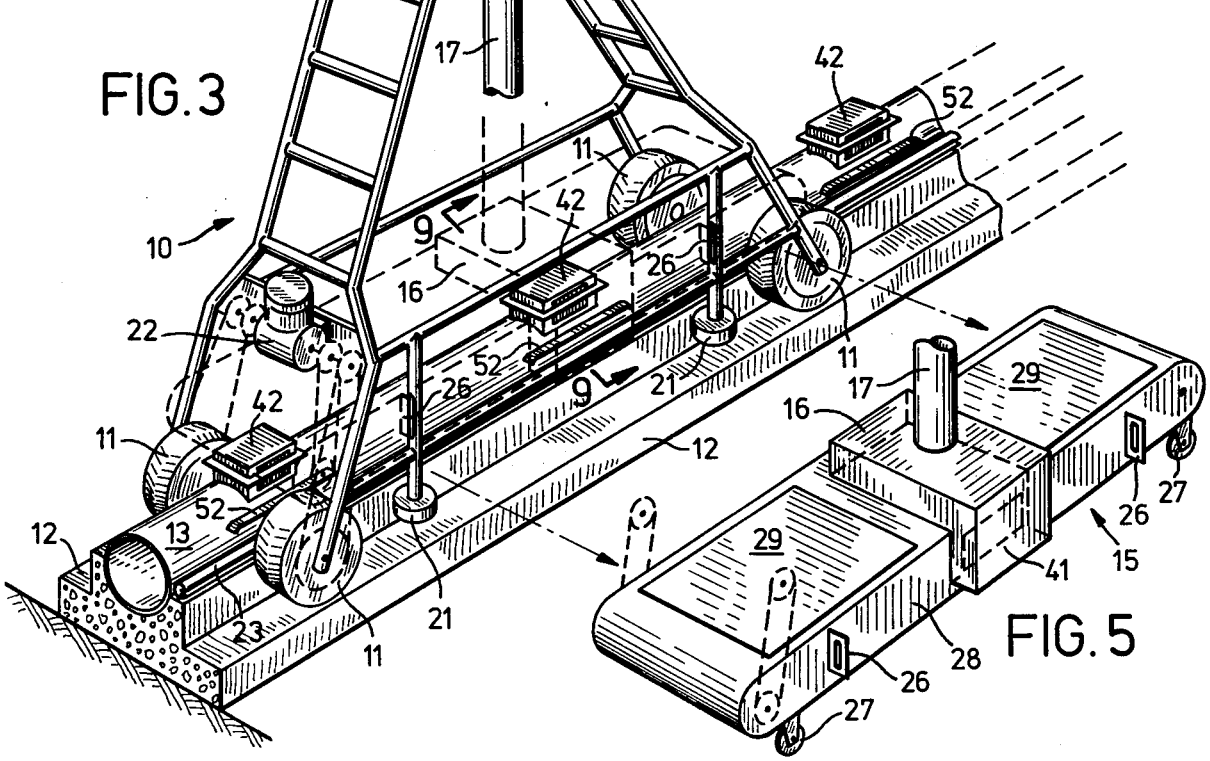
FIG. 3
FIG. 5

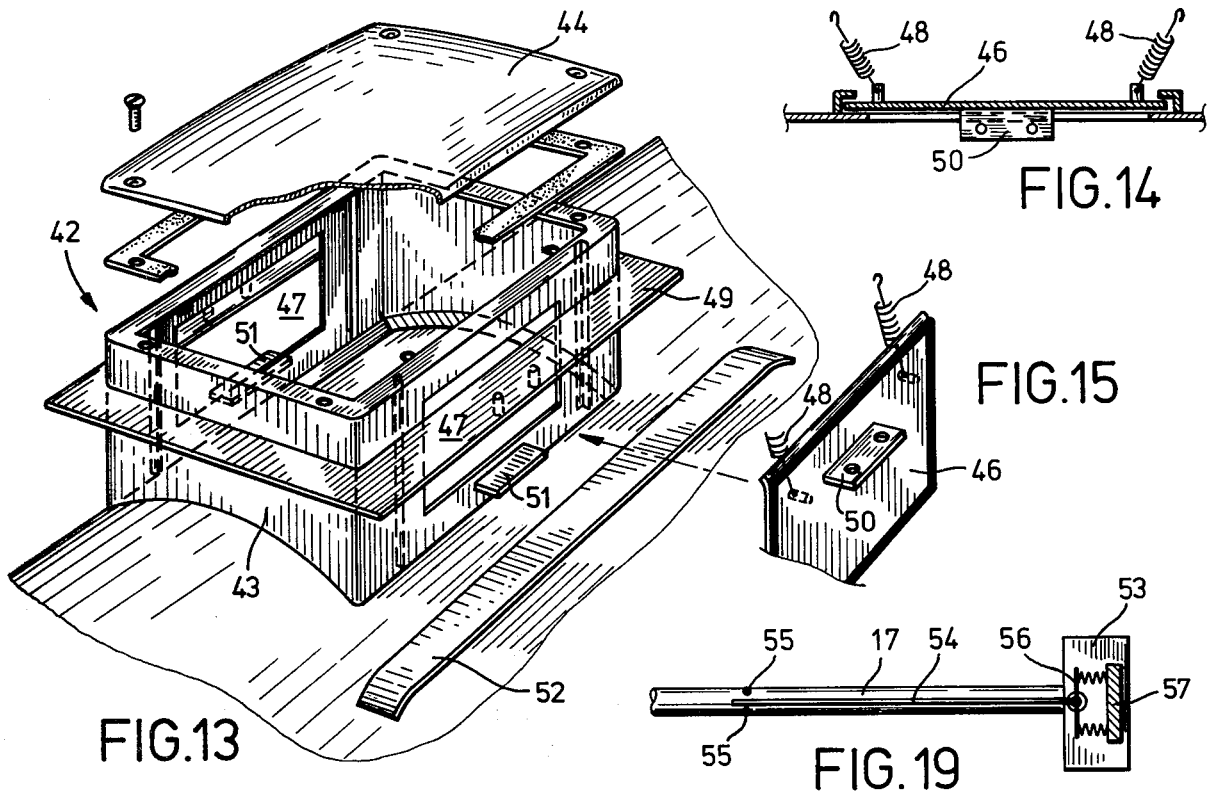
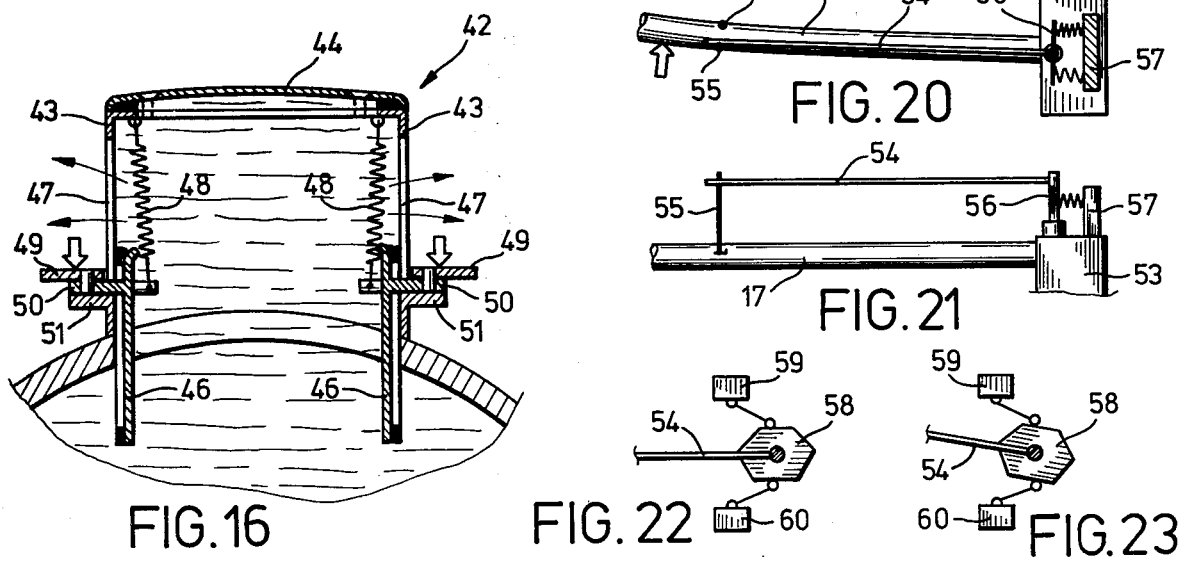
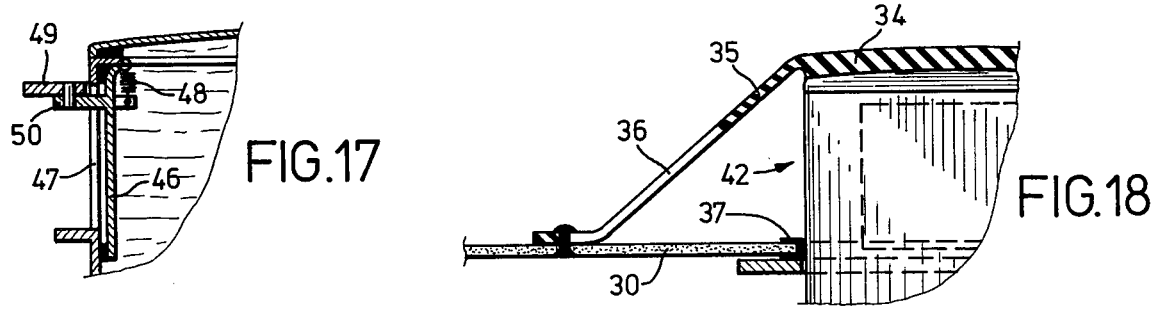

SELF-PROPELLED IRRIGATION APPARATUS

As large tracts of hitherto arid lands have been opened up for cultivation in both the western portion of the United States and in other countries of the world, deep wells have been sunk and water has been transported in canals and pipelines to such arid areas. Previously known methods of irrigation such as running surface water down rows have proved impractical for very large tracts of arid land. As a consequence, sprinkler irrigation was introduced as a means of spreading large amounts of water over large areas of land.

The sprinkler systems commonly in use today in the United States comprise a central stationary source of water in the center of the cultivated area coupled to a radially extending water pipe mounted on a self-propelled super-structure designed to pivot about the water source to irrigate a circular area surrounding the water source. Since the corners of the area are not reached by this system and the system reaches only a finite area, the limitations have become obvious to users.

Several sprinkler systems have been developed to solve this problem by mounting the system on a trolley and moving it along a longitudinal water supply pipe, extending the sprinkler arms laterally along one or both sides to reach a rectangular area as the system moved along the water pipe. Such systems include those disclosed in U.S. Pat. Nos. 3,444,941; 3,679,135; 3,970,102; and 3,984,052. All of these, as well as others that have been tried, have failed to solve the problem of valving along the pipe line. Accordingly, the vast majority of irrigation devices in use today are of the radial arm and fixed water source type.

It is an objective of this invention to provide a workable valve system for a linear water supply line, and to provide means for maintaining the alignment of the extended water distribution towers with a self-propelled trolley apparatus.

In its broadest scope, the invention is a sprinkler irrigation system adopted to be moved along a pressurized water supply line which is laid out preferably along the edge of a field, but may extend down the center or any other part of the field. The apparatus includes a plurality of valve means disposed at predetermined intervals along the upper surface of the water supply pipe. The valve means communicate with the interior of the pipe through apertures therein. The valve means have gate means which are actuated by longitudinally-extending levers along-side the valve housing as described below.

A self-propelled trolley means preferably on wheels runs along the water supply pipe, preferably on a cement pad laid down on either side of the pipe. Mounted on the trolley are a valve actuating mechanism and a water receptacle. The valve actuating mechanism has a housing and means for lowering itself over the valve means on the water pipe as it moves forward with the trolley means, and thereby depresses the lever to open the valve gates, permitting the water to pass from the pipe to the water receptacle.

The water passes from the water receptacle to the distribution system which is comprised of a secondary water pipe extended laterally outwardly from the trolley along one or more self-propelled towers. Sprinkling devices can be attached along the pipe to irrigate the field. An alignment device on the pipe at each tower is connected to the tower propulsion unit, and maintains the tower in alignment with the trolley to prevent breaks or bends in the secondary water pipe.

Figure 7:
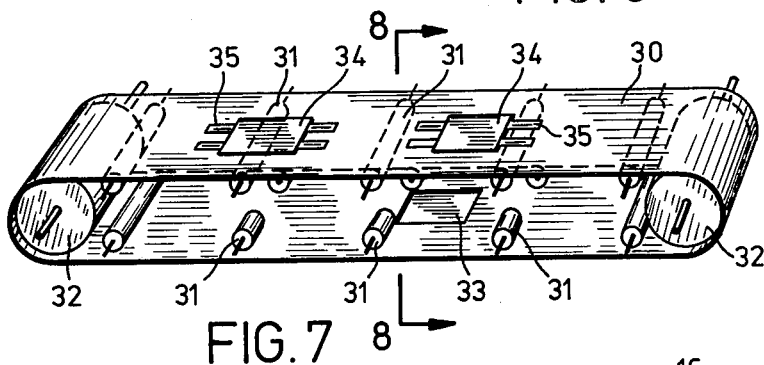
Figure 8:
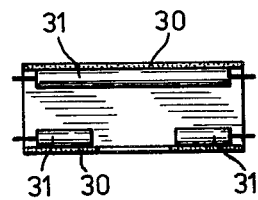

A preferred embodiment of the invention is illustrated in the accompanying drawings, in which:

FIG. 1 is a side elevational view of the apparatus, including a support tower for the secondary water line;

FIG. 2, a side elevational view of the apparatus showing water pipes extending laterally on both sides of the apparatus;

FIG. 3, a perspective view of the apparatus showing the valve actuating unit in dashed lines;

FIG. 4, an elevational cross-section of the electrical power supply;

FIG. 5, a perspective view of the valve actuating unit and water receiving tank;

FIG. 6, a perspective view of the valve actuating unit showing an access door open;

FIG. 7, a perspective view of the endless belt showing the apertures and rollers;

FIG. 8, an end elevational section view of the apparatus on the pipe line taken along line 8—8 of FIG. 7.

Figure 9A:
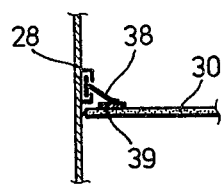
Figure 9B:
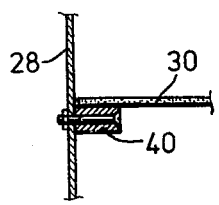
Figure 9:
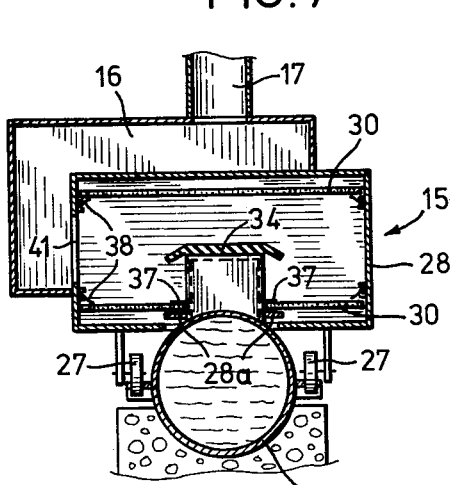

FIG. 9, an end elevational section view of the apparatus on the pipe line taken along line 9—9 of FIG. 3.

Figure 10:
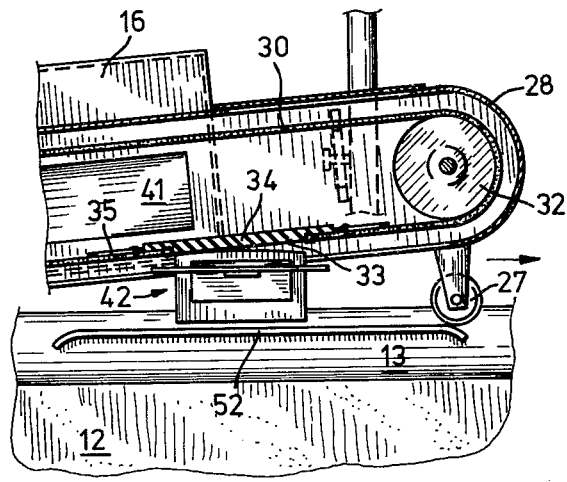
Figure 12:
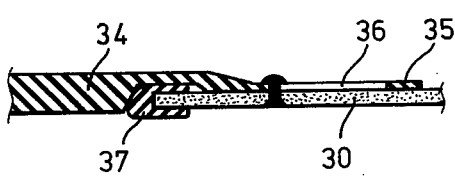
Figure 11:
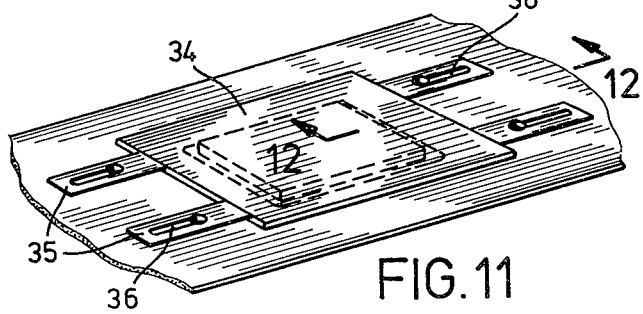

FIG. 9a, an elevational section of the sealing means for the belt as enlarged from FIG. 9;

FIG. 9b, an elevational section of an alternative sealing means for the belt similar to FIG. 9a;

FIG. 10, a partial elevational section view of the valve actuating mechanism as it lowers itself over the valve;

FIG. 11, a partial perspective view of the endless belt showing an aperture covered by a flexible closing member;

FIG. 12, a detail of the attachment means for attaching the flexible closing member to the endless belt;

FIG. 13, an exploded perspective view of the valve mechanism mounted on the water supply pipe;

FIG. 14, a top plan view of the gate mechanism in the valve mechanism;

FIG. 15, a perspective view of the gate with an arrow showing its position in the valve;

FIG. 16, an end elevational sectional view of the valve mechanism or the water supply pipe, showing the flow of water through apertures with the gates down;

FIG. 17, an enlarged elevational sectional view showing the gate in the closed position;

FIG. 18, an elevational sectional view showing the flexible cover member of FIG. 11 stretched open by the valve housing;

FIG. 19, a top plan view of the alignment member showing the member in the neutral position;

FIG. 20, a top plan view of the alignment member showing deflection of the pipe and actuation of the alignment apparatus;

FIG. 21, a side elevational view of the alignment device mounted on the water pipe;

FIG. 22, a top plan view of the cam arrangement for actuating the alignment apparatus; and FIG. 23, a top plan view of the cam arrangement as actuated by the bending of the pipe shown in FIG. 20.

As depicted in FIGS. 1, 2, 3, and 5-11, inclusive, a preferred embodiment of the invention has a trolley 10 mounted on four wheels 11 adapted to run along a pair of concrete pads 12 extending along either longitudinal side of a pressurized water supply line 13. Trolley 10 has a metal superstructure 14 which supports a valve opening apparatus 15, a water receptacle 16, and a secondary water delivery pipe 17, which extends upwardly through superstructure 14 and laterally out across the field to be irrigated. Additional support structure 18 may be required along the length of pipe 17 to support the pipe. At the far end of pipe 17 is a tower 19 which is preferably mounted on a set of motorized wheels 20 to permit independent movement of tower 19.

Trolley 10 has a plurality of alignment wheels 21 to maintain the trolley in alignment with pipe 13. An electric motor 22 drives a pair of wheels 11 to provide movement to the trolley.

FIG. 4 illustrates the electrical conduit 23 which is disposed alongside pipe 13, shown in FIG. 3. The connection is a standard moveable brush 24 arrangement attached to a line 25 extending to the motor 22.

Valve actuation apparatus 15 is vertically moveably mounted on the trolley by flanges 26 and has a plurality of wheels 27 which ride along either side of the top of pipe 13. The wheels are attached at the four corners of a generally rectangular housing 28. Housing 28 has a pair of access doors 29 along the top thereof for access to the interior of the housing 28. The bottom of housing 28 has an aperture 28a therein extending the entire length of the housing and is adapted to fit over the top of pipe 13.

Disposed within housing 28 is an endless belt 30, preferably constructed of standard reinforced rubber materials and is as wide and long as the interior of the housing. Belt 30 is mounted on a series of support rollers 31 and is looped about 2 end rollers 32, one of which is a drive roller connected to motor 22 in trolley 10, so that belt 30 rotates at the same speed as trolley 10 moves forward.

Belt 30 has three apertures 33 in its surface each of which is normally covered by a flexible cover member 34 attached to belt 30 by means of extendable straps 35 (shown in detail in FIGS. 11 and 12) riveted to belt 30. Straps 35 have elongate apertures 36 therein to permit the cover members to be opened as will be explained below. The edges of each aperture 33 have a gasket material 37 attached thereto to give strength and reduce wear at the aperture edge.

It is necessary that a water-tight seal be achieved between the outer edges of belt 30 and the interior walls of housing 28. As shown in FIGS. 9, 9a, and 9b, sealing gaskets can be employed. FIG. 9a illustrates one embodiment in which a flexible sealing member 38 is disposed between a frictionless support pad 39 on belt 30 and the interior wall of housing 28. In FIG. 9b belt 30 rests directly on a rigid sealing member 40 which is attached directly to housing 28.

An aperture 41 in the side of housing 28 permits the water to flow from aperture 33 in belt 30 into the interior of belt 30, and therefrom through aperture 41 into water receptacle 16, and from there through pipe 17 to the spray mechanism.

FIGS. 13 through 18 illustrate the valve mechanism 42 disposed atop an aperture in pipe 13 in spaced apart relationship to each other. Valve 42 has a housing 43 provided with a top cover 44 and sealing gasket 45. Housing 43 extends downwardly into pipe 13 to provide support for a pair of gates 46 disposed on either side of housing 43 and each covering an aperture 47 in the side walls of housing 43. Gates 46 are spring mounted 48 and are designed to lower into pipe 13 to expose apertures 47.

Gates 46 are actuated by a flat member 49 which extends around the perimeter of housing 43, and is attached to gate 46 by flange 50. A second flange 51 attached to housing 43 stops the downward motion of gate 46 when aperture 47 is open to permit water to flow from pipe 13.

In use, valve actuater 15 moves along pipe 13 and reaches a pair of raised tracks 52 along either side of valve 42. Wheels 27 traverse tracks 52 and raise valve actuator 15 upwardly and over valve 42. As wheels 27 drop off the far end of tracks 52, the valve actuator has seated itself on valve 42, with aperture 33 in belt 30 covering housing 43 of valve 42. The weight of belt 30 and valve actuator 15 force flat member 49 downward to open gates 46, thereby permitting water to flow through the circuit.

FIGS. 19 through 23, illustrate the alignment mechanism used to maintain towers 19 in alignment with trolley 10. A support plate 53 is attached to pipe 17 over the tower. A rod 54 extends along pipe 17 back toward the trolley. One end of rod 54 is pivoted about a pivot point on plate 53. The other end extends between 2 pins 55 extending upwardly above pipe 17. The pivoted end of rod 54 is attached to a second plate 50 which is biased to a block 57 extending upwardly from plate 53.

If pipe 17 becomes misaligned, for example by trolley 10 traveling faster than tower 19, one of pins 55 catch rod 54, as shown in FIG. 20, and force rod 54 forward. As shown in FIGS. 22 and 23, as rod 54 is forced forward, cam 58 attached to rod 54 rotates and actuates microswitch 59, which continuously feeds power to tower 19, until tower 19 can catch up to the intermittantly traveling trolley 10, and rod 54 is again biased to its rest position. As cam 58 returns to the rest position, the power to tower 19 is turned off until the tower is out of alignment with trolley 10 again. In the event trolley 10 lags behind tower 19, rod 54 is moved in the opposite direction and again microswitch 59 is moved in the opposite direction to turn off power to tower 19 until trolley 10 catches up.

Microswitch 60 on the opposite side of rod 54 is a failsafe mechanism. In the event the motors to either trolley 10 or tower 19 fail to shut off when pipe 17 is out of alignment and microswitch 59 is actuated, the continued movement of pipe 17 and rod 54 would move cam 58 around to actuate microswitch 60. Actuation of microswitch 60 completely shuts down the system until the defect is repaired.

It is understood that the particular form of the invention described herein and illustrated in the accompanying drawing is a preferred embodiment. Various changes in size, shape, materials and arrangements of parts may be made without departing from the scope of the invention as defined in the attached claims.

I claim:

1. A self-propelled irrigation apparatus comprising in combination:
   elongate pipe means extending along an area to be irrigated and being connected to a source of pressurized water;
   a plurality of spaced-apart normally closed valve means disposed along the upper side of said pipe means, each of said valve means having lever means for being depressed to open gate means in said valve means to permit the flow of water through the valve means;
   self-propelled trolley means for moving along said pipe means;
   valve-actuating means mounted on said trolley means for actuating said valve means, including housing means mounted on wheels and having an aperture along its underside for communicating with the upper side of said elongate pipe and having at least one additional aperture along a vertical side, said housing being vertically-moveably mounted on said trolley means to permit vertical motion with respect to the trolley means as the trolley and valve-actuating means move along the pipe means;

endless belt means mounted within the housing on a plurality of roller means and being driven by a drive roller at the same speed as the self-propelled trolley means, said belt means having a plurality of apertures on the surface thereof in register with and for encircling said valve means on said elongate pipe means, and being covered by flexible members to hold the apertures normally closed, the belt means being water-tight along the edges thereof with the side of the housing within the interior perimeter of the belt means;

receptacle means communicating with the side aperture in the housing for receiving the water from the housing and being connected to second pipe means for carrying the water to the area to be irrigated; and elongate raised track means disposed on the pipe means along either longitudinal side of said valve means; such that as the housing moves along the pipe means, the wheels thereof engage the track means to raise the housing until an endless belt aperture is in register with a valve means, then lowering the aperture over the valve means with the endless belt means depressing said lever to open the valve means; and distribution means for distributing the water from the receptacle means to the area to be irrigated.

2. An irrigation apparatus as set forth in claim 1, wherein said distribution means comprises a superstructure mounted on at least one self-propelled carriage carrying second pipe means connected to said receptacle means for transporting water from the receptacle means to the area to be irrigated, said second pipe means having spray means for distributing the water from the second pipe means over the area to be irrigated.

3. An irrigation apparatus as set forth in claim 2, including alignment means attached to each self-propelled carriage for maintaining said second pipe means in pre-determined alignment with said receptacle means.

4. An irrigation apparatus as set forth in claim 1, wherein said valve means comprises in combination:
  a rectangular housing mounted on said elongate pipe means and communicating through an aperture with the interior of the pipe means;
  biased gate means covering at least one aperture in a side of said housing; said gate means holding the gate in a normally closed position;
  depressable lever means external of the housing attached to the gate means for opening the gate means when the lever means is depressed, thereby permitting the flow of water through the valve means.

5. An irrigation apparatus as set forth in claim 4, wherein apertures and biased gates are disposed on opposite lateral sides of said housing.

6. An irrigation apparatus as set forth in claim 4, wherein said actuating lever comprises a flat member extending longitudinally along the length of at least one verticle side of said housing forming a track.

7. An irrigation apparatus as set forth in claim 1, wherein said housing has normally sealed access doors to permit adjustment of the endless belt means.

8. An irrigation apparatus as set forth in claim 1, wherein said trolley means is powered by an electric motor.

9. An irrigation apparatus as set forth: claim 8, including electrical conduit extending along said pipe means so as to provide a constant source of electrical energy to said electric motor.

* * * * *